United States Patent [19]
Tsukamoto et al.

[11] Patent Number: 5,579,883

[45] Date of Patent: Dec. 3, 1996

[54] AUTOMATIC TRANSMISSION

[75] Inventors: Kazumasa Tsukamoto, Toyota; Masahiro Hayabuchi, Anjo; Masanori Kadotani, Nishio; Satoru Kasuya, Hekinan, all of Japan

[73] Assignee: Aisin AW Co., Ltd., Japan

[21] Appl. No.: 437,314

[22] Filed: May 9, 1995

[30] Foreign Application Priority Data

May 9, 1994 [JP] Japan .................................... 6-117460

[51] Int. Cl.$^6$ .............................. F16H 57/10; F16H 3/44
[52] U.S. Cl. ........................ 192/87.15; 475/148; 475/285
[58] Field of Search ........................... 192/87.11, 87.15, 192/87.17, 48.91, 85 AA; 475/146, 148, 284, 285

[56] References Cited

U.S. PATENT DOCUMENTS

| | | | |
|---|---|---|---|
| 3,803,948 | 4/1974 | Clauss et al. ........................ | 475/146 X |
| 3,926,073 | 12/1975 | Roche et al. ............................ | 475/148 |
| 4,713,984 | 12/1987 | Ohkubo ............................... | 475/146 X |
| 4,735,111 | 4/1988 | Hayakawa et al. ..................... | 475/146 |

*Primary Examiner*—Richard M. Lorence
*Attorney, Agent, or Firm*—Lorusso & Loud

[57] ABSTRACT

First and second hydraulic servo units operate respective frictional engagement elements in a transmission and each includes first and second cylinders, each having a side wall portion interposed between the two frictional engagement elements. The first cylinder has first outer and inner cylinder portions and the first hydraulic servo unit further includes a first piston having inner and outer cylindrical surfaces slidably supported by the first outer and first inner cylinder portions of the first cylinder for reciprocating axial motion into and out of engagement with one frictional engagement element. First return springs are arranged radially inward of the one frictional engagement element for returning the first piston. The second cylinder includes second outer and inner cylinder portions and the second hydraulic servo unit further includes a second piston having a larger diameter portion and a smaller diameter portion, slidably supported by the inner cylindrical surfaces of the second outer cylinder portion and the first inner cylinder portion, for reciprocating axial motion into and out of engagement with the second frictional engagement element. Second return springs are arranged around the inner circumference of the one frictional engagement element for returning the second piston.

10 Claims, 3 Drawing Sheets

| | C-0 | C-1 | C-2 | B-0 | B-1 | B-2 | B-3 | B-4 | F-0 | F-1 | F-2 | Gear Ratio |
|---|---|---|---|---|---|---|---|---|---|---|---|---|
| P | O | | | | | | | | | | | — |
| REV | | | O | O | | | | O | | | | 3.139 |
| N | O | | | | | | | | | | | — |
| 1ST | O | O | | | | | | (O) | O | | O | 3.357 |
| 2ND | (O) | O | | | | O | | | O | | | 2.194 |
| 3RD | O | O | | (O) | O | | | | O | O | | 1.432 |
| 4TH | O | O | O | | | ⊗ | | | O | | | 1.000 |
| 5TH | | O | O | O | | ⊗ | | | | | | 0.705 |

( ) : at Engine Brake  ⊗ : Aplied with No Torque Transmission

AUTOMATIC TRANSMISSION

BACKGROUND OF THE INVENTION

1. Field of the Invention

The present invention relates to an automatic transmission and, more particularly, to a hydraulic servo unit for applying/releasing frictional engagement elements of the automatic transmission.

2. Related Art

In automatic transmissions have cylinders of hydraulic servo units arranged in a back-to-back relationship, it is customary (as in Japanese Patent Laid-Open No. 8851/1983) that the return springs for returning the pistons of the hydraulic servo units are arranged within the spaces interior to the inner circumferences of the individual frictional engagement elements, with each spring having one end connected to the cylinder and its opposite end connected to the piston.

In such an arrangement, the frictional engagement elements and the return springs are arranged with their respective inner and outer circumferences axially overlapped. Such an arrangement is effective to minimize the axial length for the combination of the frictional engagement elements and their hydraulic servo units. However, this arrangement cannot always be said to be rational taking into consideration the entirety of the automatic transmission, including the arrangement of the shift elements, such as the planetary gears to be connected by those frictional engagement elements.

In the pursuit of a rational arrangement for compactness and improved mountability of the automatic transmission, the shift elements, such as planetary gears, could be arranged radially inward of one frictional engagement element. However, the space interior to the hydraulic servo unit associated with the shift elements is occupied by the shift elements so that no room remains in that space for the return springs, contrary to the previously described arrangement.

SUMMARY OF THE INVENTION

One object of the present invention is to solve the foregoing problems by providing an improved piston-cylinder construction for a pair of hydraulic servo units having cylinders arranged back-to-back for operation of two frictional engagement elements, wherein not only the return springs of two hydraulic servo units but also the shift elements are arranged in the space defined by the inner circumference of the frictional engagement elements.

Another object of the present invention is to provide a piston-cylinder servo mechanism allowing for location of the return springs of the two hydraulic servo units in the space radially inward of one frictional engagement element.

Still another object of the present invention is to provide an integrated arrangement of the return springs of two hydraulic servo units, while minimizing the radial size, by utilizing the inner circumferential space of one frictional engagement element.

A further object of the present invention is to unite the return springs of the two hydraulic servo units into an integral structure.

A further object of the present invention is to provide a dual servo piston-cylinder mechanism in which one hydraulic servo unit has a significantly larger capacity as compared to the other hydraulic servo unit.

In order to achieve the above-specified objects, the present invention provides an automatic transmission first and second axially juxtaposed frictional engagement elements. These frictional engagement elements are operated by, respectively, first and second hydraulic servo units. These hydraulic servo units include, respectively, first and second cylinders, each having a side wall portion interposed between the two frictional engagement elements. The first cylinder includes a first outer cylinder portion extending from the outer circumference of a radially-extending side wall portion thereof toward the first frictional engagement element, and a first inner cylinder portion extending from the inner circumference thereof toward the first frictional engagement element. The first hydraulic servo unit further includes a first piston which has inner and outer cylindrical surfaces slidably supported by, respectively, the first inner and first outer cylinder portions of the first cylinder, for sliding motion in the axial direction into and out of engagement with the first frictional engagement element. First return springs are arranged around the inner circumference of the first frictional engagement element for returning the first piston. The second cylinder includes a second outer cylinder portion extending from the outer circumference of a side wall portion thereof toward the second frictional engagement element, and a second inner cylinder portion. Preferably, a section of the second cylinder forms the first inner cylinder portion which is intermediate and integral with the second inner and outer cylinder portions. The second hydraulic servo unit further includes a second piston having a larger-diameter cylindrical portion and a smaller-diameter cylindrical portion slidably supported by the inner surfaces of, respectively, the second outer cylinder portion and second inner cylinder portion, for sliding motion in the axial direction into and out of engagement with the second frictional engagement element. Second return springs are arranged around the inner circumference of the first frictional engagement element for returning the second piston.

According to another feature of the present invention, the first inner cylinder portion, which supports the inner cylindrical surface of the first piston, is integral with the second inner cylinder portion, which supports the smaller diameter of the second piston. An extension portion is integral with and extends from the first inner cylinder portion to a point radially inward of the first frictional engagement element where it integrally connects with the second inner cylinder portion. The first and second return springs are arranged around the outer circumference of the second inner cylinder portion.

According to yet another feature of the present invention, the first return springs and the second return springs are arranged back-to-back, i.e. the first springs bear against a common support from one direction and the second springs bear against the same common support from the opposite direction. The first return springs have their ends opposite the common support connected to the first piston whereas the second return springs their ends opposite the common support connected to the second piston.

In another embodiment of the present invention, separate first and second sets of return springs are eliminated in favor of a single set of springs, combining the functions of both sets of springs in the previous embodiment, wherein all springs have one end fixed to the first piston and the other end connected to the second piston.

According to a further feature of the present invention, the second frictional engagement element is one which has a larger capacity than that of the first frictional engagement element so that it is applied at a lower gear stage than the first frictional engagement element.

The above-specified features of the present invention allow for a space for mounting the shift elements, such as the planetary gear units, radially inward of the frictional engagement elements, thereby making the automatic transmission more compact.

In addition to the aforementioned advantage of compactness, the present invention also allows for reducing the number of assembly steps by providing a spring support shared in common by the return springs of the two hydraulic servo units.

Moreover, the present invention has the return springs of the two hydraulic servo units united and arranged radially inward of one frictional engagement element without an increase in the overall radial dimension of the transmission.

Further, the piston return mechanism is simplified and the number of assembling steps reduced by uniting the return springs of the two hydraulic servo units.

Furthermore, it is possible to provide an automatic transmission having a rational arrangement of hydraulic servo units, which is able to apply a higher force to one of the frictional engagement elements at a lower speed stage requiring a higher torque capacity.

DESCRIPTION OF THE PREFERRED EMBODIMENTS

FIGS. 1 to 5 show a first embodiment of the present invention. As shown schematically in FIG. 2, the automatic transmission A has five speeds, combining an auxiliary transmission D including a pre-overdrive planetary gear unit and a main transmission mechanism M providing four forward and one reverse speeds and including three simply-connected planetary gear trains. The transmission A receives the rotational output of an engine through a torque converter T having a lockup clutch.

The auxiliary transmission mechanism D includes a one-way clutch F-0 associated with a sun gear S0, a carrier C0 and a ring gear R0; a multi-disc clutch C-0 in parallel with the one-way clutch F-0; and a multi-disc brake B-0 in series with the multi-disc clutch C-0. On the other hand, the main transmission mechanism M has three sets of simply connected planetary gear units P1 to P3 which include, respectively, sun gears S1 to S3, carriers C1 to C3 and ring gears R1 to R3 simply connected in series. In association with the elements of the individual planetary gear units, there are multi-disc clutches C-1 and C-2, a band brake B-1, multi-disc brakes B-2 to B-4, and one-way clutches F-1 and F-2.

Each of the clutches and brakes is equipped with a hydraulic servo mechanism which is composed of a piston and cylinder for applying/releasing those frictional engagement elements under control of a servo oil pressure regulated by a hydraulic control unit (not shown).

Figure 2:
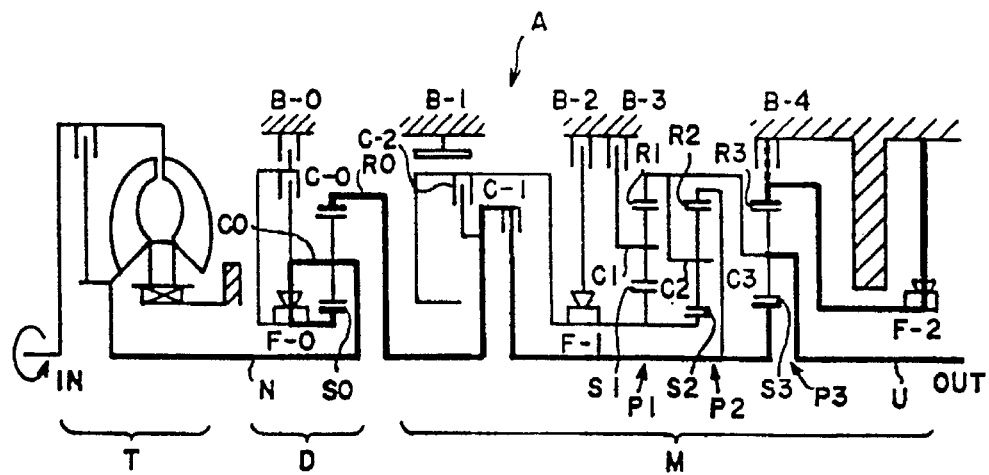
FIG. 2 is a skeletal diagram showing the state of the transmission of the first embodiment in 1st speed.

The rotational output of an engine (not shown) is transmitted to the input shaft N of the auxiliary transmission mechanism D through the torque converter T. To establish 1st speed the clutch C-0 is applied to directly connect the auxiliary transmission mechanism D and the clutch C-1 of the main transmission mechanism M is applied, but all the remaining brakes are released. Refer to the operation table of FIG. 5 wherein application is indicated by the symbol o. In this 1st speed state the rotation of the input shaft N is input to the sun gear S3 of the gear unit P3, as shown in FIG. 2, with reverse rotation of the ring gear R3 blocked by the one-way clutch F2 so that the 1st speed rotation is output from the carrier C3 to an output shaft U.

Figure 3:
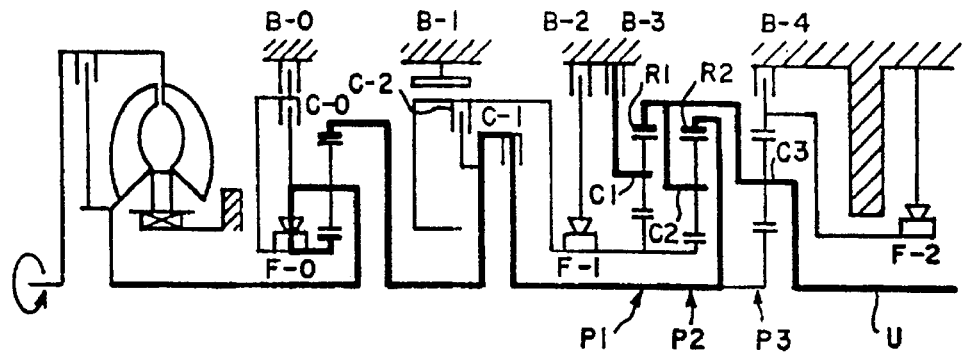
FIG. 3 is a skeletal diagram showing the state of the transmission of the first embodiment in 2nd speed.

The 2nd speed is achieved when the auxiliary transmission mechanism D is directly connected and, as shown in FIG. 3, the clutch C-1 and the brake B-3 are applied. Again, reference should be made to FIG. 5. At this time, the input to the ring gear R2 of the planetary gear unit P2 is output, with the carrier C1 of the planetary gear unit P1 acting as a reaction element, to the carrier C2 of the gear unit P2 and to the ring gear R1 of the gear unit P1, which is directly connected to the carrier C2, and the carrier C3 of the gear unit P3 to output 2nd speed as rotation of the output shaft U.

Figure 4:
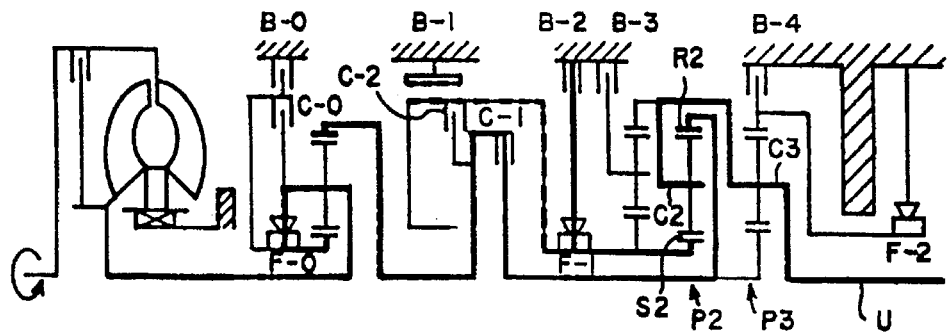
FIG. 4 is a skeletal diagram showing the state of the transmission of the first embodiment in 3rd speed.

The 3rd speed is also established when the auxiliary transmission mechanism D is directly connected and, as shown in FIG. 4, the clutch C-1 and the brake B-3 are applied. Again, refer to FIG. 5. At this time, the input is entered at the ring gear R2 of the gear unit P2 and is output, with the sun gear S2 acting as a reaction element, to the carrier C2 and the carrier C3 of the gear unit P3, to establish 3rd speed in rotation of the output shaft U.

The 4th speed is established when the auxiliary transmission mechanism D is directly connected and both the clutch C-1 and the clutch C-2 are applied. Since, at this time, the input is to the ring gear R2 and the sun gear S2, the gear unit P2 comes into its directly connected state so that the input rotation is output as is.

The 5th speed is achieved, with the main transmission mechanism M being in the state of the aforementioned 4th speed, by releasing the clutch C-0 and by applying the brake B-0 to fix the sun gear S0, to thereby accelerate the rotation of the auxiliary transmission mechanism D.

Reverse is established with the auxiliary transmission mechanism D being in the aforementioned state, by applying the clutch C-2 and the brake B-4 of the main transmission mechanism M. In this manner, the rotation input to the sun gear S2 of the gear unit P2 is output as reverse rotation of the carriers C2 and C3 of the gear units P2 and P3, with the ring gear R3 acting as a reaction element.

Figure 1:
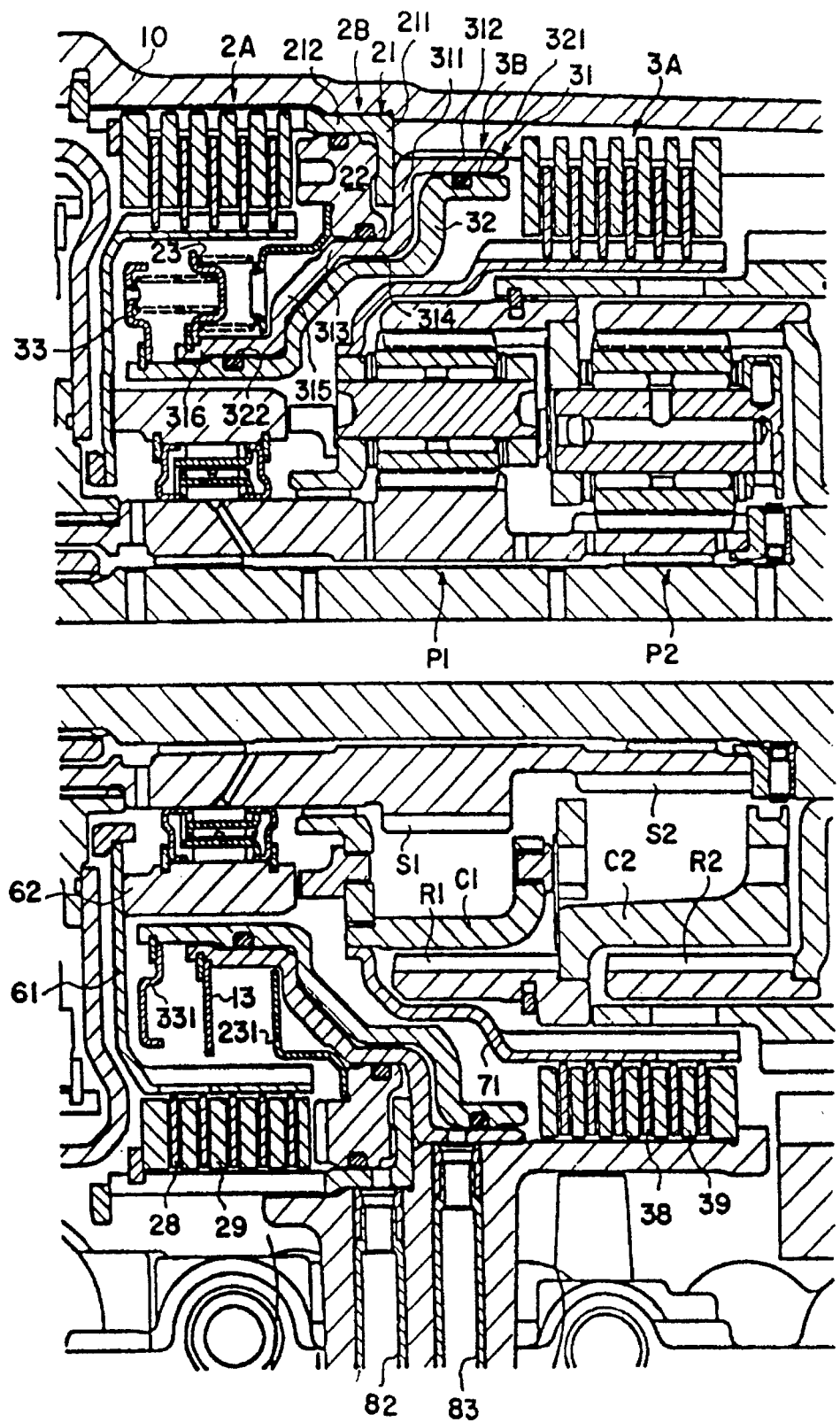
FIG. 1 is a cross-sectional view of an axial portion of an automatic transmission according to a first embodiment of the present invention.

In the embodiment illustrated in FIG. 1, the present invention is applied to the brake B-2 and the brake B-3. Specifically, as shown in FIG. 1, a frictional engagement element 2A (hereinafter "first frictional engagement element") of the brake B-2 and a frictional engagement element 3A (hereinafter "second frictional engagement element") of the brake B-3 are axially aligned. Between these two frictional engagement elements 2A and 3A, are interposed a side wall portion 211 of a hydraulic servo unit 2B (or "first hydraulic servo unit") for the brake B-2 and a side wall portion 311 of a hydraulic servo unit 3B (or "second hydraulic servo unit") for the brake B-3. The hydraulic servo unit 2B includes a cylinder 21 (or "first cylinder") which, in turn, includes the side wall portion 211, a first outer cylinder portion 212 depending from the outer circumference of the side wall portion 211 and extending toward the frictional engagement element 2A of the brake B-2, and a first inner cylinder portion 313 extending from the inner circumference of the side wall portion 311 toward the frictional engagement element 2A. Hydraulic servo unit 2B further includes a piston (or a "first piston") 22 having its inner and outer cylindrical surfaces slidably supported by and sealing engaged by, respectively, the first outer cylinder portion 212 and the inner cylinder portion 313 of the cylinder 21 for sliding motion in the axial direction into and out of engagement with frictional engagement element 2A. Return springs 23 (one shown—"first return spring") are mounted around the inner circumference of the frictional engagement element 2A for returning the piston 22. The hydraulic servo unit 3B includes a cylinder 31 (or "second cylinder") having a second outer cylinder portion 312 extending from the outer circumference of the side wall portion 311 toward the frictional engagement element 3A of the brake B-3, a cylinder portion 313, which also serves as the first inner cylinder portion of cylinder 21, and a second inner cylinder portion 316. The hydraulic servo unit 3B further includes a piston 32 (or "second piston") having a larger-diameter portion 321 and a smaller-diameter portion 322 slidably supported, respectively, by the inner surface of the second outer cylinder portion 312 and by a second inner cylinder portion 316, for axial motion into and out of engagement with the second frictional engagement element 3A. Second return springs 33 are arranged around the inner circumference of the frictional engagement element 2A for returning the piston 32.

An extension portion 315 connects the first inner cylinder portion 314 to the second inner cylinder portion 316 which surrounds and sealingly engages smaller diameter portion 322 of piston 32. The return spring 23 of the brake B-2 and the return springs 33 of the brake B-3 are arranged around the outer circumference of the second inner cylinder portion 316.

The return springs 23 of the brake B-2 and the return springs 33 of the brake B-3 are arranged back-to-back to each other, serially, in the axial direction. Springs 23 each have one end bearing against one side of a spring seat 13 which is fixed to and radially extends from second inner cylinder portion 316 and springs 33 bear against the opposite side of the common spring seat 13. The other ends of the first return springs 23 are connected to the first piston 22 through a spring seat 231, and the other ends of the second return springs 33 are connected to the second piston 32 through a spring seat 331.

In this embodiment, the second frictional engagement element 3A has a larger capacity, i.e., a higher transmission torque than that of the first frictional engagement element 2A and is applied at a lower gear stage, i.e., the 2nd speed, than is the first frictional engagement element 2A. This is to effectively exploit the fact that the pressure receiving area of the piston 32 of the hydraulic servo unit 3B, which operates the second frictional engagement element 3A, is necessarily made larger than that of the piston 22 of servo 23, which operates the first engagement element 2A, because of the structural requirements of the overall design of those piston-cylinder mechanisms.

The first frictional engagement element 2A has hub-side friction members 28 and case side friction members 29 which are alternately arranged in the axial direction. The hub-side friction members 28 have their inner circumferences splined to a brake hub 61, which is fixed on the outer race 62 of the one-way clutch F-1. The case-side friction members 29 are splined to slits which are formed in the outer cylinder portion 212 of the cylinder 21, so that they are prevented from rotation and are supported by transmission case 10 through the cylinder 21.

The second frictional engagement element 3A has hub-side friction members 38 and case-side friction members 39 which are alternately arranged in the axial direction. The hub-side friction members 38 have their inner circumferences splined to a brake hub 71, which is fixed on the carrier C1 of the gear unit P1. The case-side friction members 39 are directly splined to the transmission case 10 so that they are supported thereby while held against rotation.

The cylinders 21 and 31 of the servo 2B and the servo 3B are made of two members which are pressed of steel sheets and welded to each other. One member includes the radially extending first side wall portion 211 and the first outer cylinder portion 212 which integrally connects with the outer circumference of the side wall portion 211. This outer cylinder portion 212 has its front half slitted for the aforementioned splined connection with friction members 29. The other welded member is formed of the radially extending side wall portion 311 and the second outer cylinder portion 312 which is integrally connected to the outer circumference of the second side wall portion 311. The second outer cylinder portion 312 is splined to the inner circumference of the transmission case 10 and thereby held against rotation. The latter of the two members welded together further includes first extension portion 313 and, integral with extension portion 313, frusto-conical connection portion 315.

The piston 22 is formed with an annular shape and has its outer and inner cylindrical surfaces slidably supported, respectively, by the inner and outer cylindrical portions of the cylinder 21 through seals in the form of O-rings. The spring seat 231 has its radially outermost end fixed to a shoulder (step portion) formed in the radially innermost side of the piston 22.

The piston 32 is cylindrical and shaped substantially similar to the aforementioned cylinder 31, with its largest-diameter outer portion and smallest-diameter inner portion in sliding engagement, respectively, with the second outer cylindrical portion 312 and second inner cylindrical portion 316 of the cylinder 31, through seals provided by O-rings. The spring seat 331 is fixed by a snap ring to the trailing end of the piston 32 which extends axially beyond the distal end of the cylinder 31 (second inner cylindrical portion 316).

The return springs 23 consist of a plurality of coil springs which are equally spaced around the shaft circumference. These coil springs are loaded under a predetermined compression, each having one end supported in abutment against the spring seat 13 and their other end of slightly reduced radius fitted on the spring seat 231.

The return springs 33 likewise consist of a plurality of coil springs which are equally spaced around the shaft circumference. These coil springs are loaded under a predetermined compression, each having one end supported in the recess of the spring seat 13 and its other end of slightly reduced radius fitted to the spring seat 331. In this embodiment, the return springs 33 are coaxial with the return springs 23. Therefore, the winding radius of springs 23 is larger than that of springs 33 to allow each spring 23 to partially axially overlap a spring 33, to thereby increase the effective length relative to the available space. However, these springs 33 may be arranged in alternating fashion with springs 23 around the shaft circumference.

In this embodiment, the two planetary gear units P1 and P2 are arranged radially inward of the frictional engagement element 3A of the brake B-3 ("second frictional engagement element 3A") and its servo 3B. In FIG. 1, reference numeral 82 designates a hydraulic feed/drain oil passage for the brake B-2 and numeral 83 a hydraulic feed/drain oil passage for the brake B-3. The sun gear S1 of the gear unit P1 is made integral with the external shaft. R1 designates the ring gear of the gear unit P1, C2 designates the carrier of the gear unit P2, as connected to the gear unit P1, and R2 is the ring gear of the gear unit P2.

In the brake B-2 thus constructed, the friction members 28 and 29 of the frictional engagement element 2A are applied to establish the 3rd speed by engagement with the piston 22. The piston 22 is forced into engagement, while compressing the return springs 23, by the oil pressure of the working oil discharged from the hydraulic pump (not shown). This oil pressure which operates piston 22 is regulated through the hydraulic control unit, and is fed from the hydraulic feed/drain oil passage 82 to the back of the piston 22. The friction members 28 and 29 are released as the piston 22 is retracted by the return springs 23 when the oil pressure is discharged. On the other hand, the friction members 38 and 39 of the frictional engagement element 3A are pressed together, to apply brake B-3 and to thereby establish the 2nd speed, by operation of the piston 32. The piston is forced into engagement, while compressing the return springs 33, by the oil pressure fed via a similar passage from the hydraulic feed/drain oil passage 83 to the back of the piston 32. When the oil pressure is discharged, the friction members 38 and 39 are released as the piston 32 is retracted by the return springs 33 when the oil pressure is discharged.

Thus, according to the embodiment of an automatic transmission described above, the piston 32 of one hydraulic servo unit 3B is not slidably supported at its outer and inner cylindrical surfaces by a cylinder as in the prior art but, rather, it is constructed such that it is slidably supported by the cylinder at two areas on its outer cylindrical surface, i.e. the outer surfaces of cylindrical portions 321 and 322 having different diameters. Because in this construction the slidably supported cylinder portions are axially spaced, sufficient space is provided, radially inward of the piston-cylinder of the hydraulic servo unit 3B and of the frictional engagement element which it operates, to accommodate the gear units P1 and P2. In addition, the return springs 23 and 33 are located within the interior space defined by another frictional engagement element 2A. Thanks to these arrangements, the automatic transmission can be made compact, especially in the axial dimension.

Figures 5, 6:
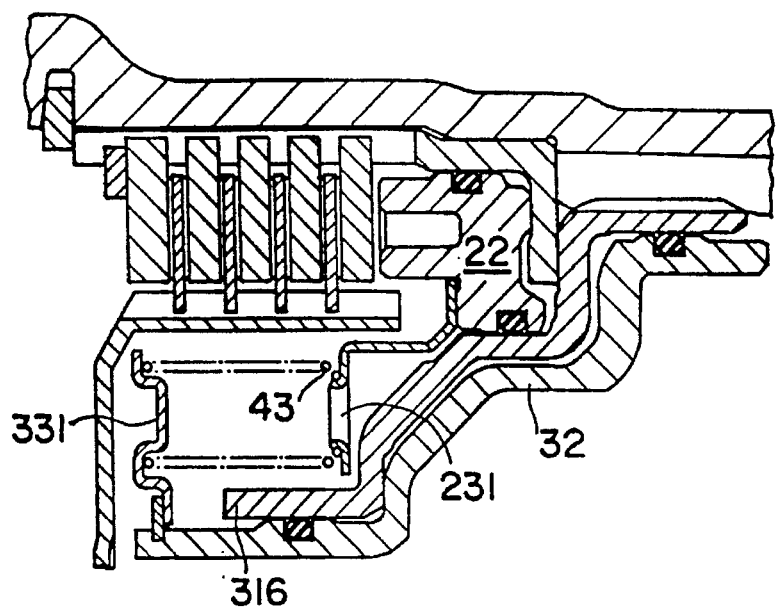
FIG. 5 is a table of operation of the application/release of frictional engagement elements at the individual gear stages of the first embodiment of the automatic transmission of the present invention.
FIG. 6 is an enlarged cross-sectional view of an axial portion of an automatic transmission according to a second embodiment of the present invention.

While the first and second return springs are made separate in the foregoing first embodiment. As shown in FIG. 6, the separate first return springs 23 and second return springs 33 can be eliminated in favor of a common return spring 43, which has one end connected to the first piston 22 by a press-fit onto the spring seat 231, where it is fixed by a snap ring, and its other end connected to the second piston 32 by a press-fit on the spring seat 331, where it is likewise fixed by a snap ring. The construction of this latter embodiment not only increases the effective length of the return spring 43, thereby stabilizing the spring characteristics, but also causes the spring seats 231 and 331 to function as reaction supporting members against the individual displacements of other connection portions. As a result, the construction can be so simplified as to eliminate the mounting of the return springs 43 on the spring seats acting as reaction supports and on the second inner cylindrical portion 316, so that the number of assembly steps can be reduced.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An automatic transmission comprising:

axially juxtaposed first and second friction engagement elements;

a first hydraulic servo unit for operating said first frictional engagement element, said first hydraulic servo unit comprising a first cylinder, a first piston, having inner and outer cylindrical surfaces and slidably supported in said first cylinder for sliding motion between a position engaging said first frictional engagement element and a disengaged position, and first spring return means for biasing said first piston toward the disengaged position, said first cylinder comprising:

a first side wall portion interposed between said first and second frictional engagement elements;

a first outer cylinder portion extending from an outer circumference of said first side wall portion toward said first frictional engagement element and slidably supporting said outer cylindrical surface of said first piston; and a first inner cylinder portion connected to said first outer cylinder portion through said first side wall portion, extending toward said first frictional engagement element and slidably supporting said inner cylindrical surface of said first piston;

a second hydraulic servo unit for operating said second frictional engagement element, said second hydraulic servo unit comprising a second cylinder, a second piston, having larger diameter and smaller diameter cylindrical portions, slidably mounted in said second cylinder for sliding motion between a position engaging said second frictional engagement element and a disengaged position, and second spring return means for biasing said second piston toward its disengaged position, said second cylinder comprising:

a second sidewall portion interposed between said two frictional engagement elements;

a second outer cylinder portion extending from an outer circumference of said second sidewall portion toward said second frictional engagement element, said second outer cylinder portion slidably supporting the larger diameter portion of said second piston;

a second inner cylinder portion slidably supporting said smaller-diameter portion of said second piston; and wherein said first inner cylinder, said second inner cylinder, said second outer cylinder, said second sidewall portion and a connecting portion are united in a single, integral structure, said second outer cylinder portion being integrally connected to said second inner cylinder portion through, in succession, said second sidewall portion, said first inner cylinder portion and said connecting portion.

2. An automatic transmission according to claim 1, wherein said second inner cylinder portion has an inner surface in sliding contact with an outer surface of said smaller-diameter portion of said second piston.

3. An automatic transmission according to claim 1 wherein said smaller-diameter portion of said second piston defines an outer surface and wherein said first spring return means and said second spring return means each comprises a plurality of springs arranged around the outer surface of said smaller-diameter portion of said second piston.

4. An automatic transmission according to claim 3 further comprising a spring support fixed to said second inner cylinder portion and wherein said springs of said first spring return means are arranged in a back-to-back relationship with said springs of said second spring return means, with each of said first plurality of return springs supported by and bearing against said spring support from one direction and each of said second plurality of springs being supported by and bearing against said spring support from a second direction, the ends of said first plurality of springs opposite said spring support being connected to said first piston and the ends of said second plurality of springs opposite said spring support being connected to said second piston.

5. An automatic transmission according to claim 4 wherein said spring support is fixed to said second inner cylinder portion.

6. An automatic transmission comprising:
axially juxtaposed first and second friction engagement elements;
a first hydraulic servo unit for operating said first frictional engagement element, said first hydraulic servo unit comprising a first cylinder, a first piston, having inner and outer cylindrical surfaces and slidably supported in said first cylinder for sliding motion between a position engaging said first frictional engagement element and a disengaged position, and first spring return means for biasing said first piston toward the disengaged position, said first cylinder comprising:
a first side wall portion interposed between said first and second frictional engagement elements;
a first outer cylinder portion extending from an outer circumference of said first side wall portion toward said first frictional engagement element and slidably supporting said outer cylindrical surface of said first piston; and
a first inner cylinder portion connected to said first outer cylinder portion through said first side wall portion, extending toward said first frictional engagement element and slidably supporting said inner cylindrical surface of said first piston;
a second hydraulic servo unit for operating said second frictional engagement element, said second hydraulic servo unit comprising a second cylinder, a second piston, having larger diameter and smaller diameter cylindrical portions, slidably mounted in said second cylinder for sliding motion between a position engaging said second frictional engagement element and a disengaged position, and second spring return means for biasing said second piston toward its disengaged position, said second cylinder comprising:
a second sidewall portion interposed between said two frictional engagement elements;
a second outer cylinder portion extending from an outer circumference of said second sidewall portion toward said second frictional engagement element, said second outer cylinder portion slidably supporting the larger diameter portion of said second piston;
a second inner cylinder portion slidably supporting said smaller-diameter portion of said second piston; and
wherein said smaller-diameter portion of said second piston defines an outer surface and wherein said first spring return means and said second spring return means each comprise a plurality of springs arranged around the outer surface of said smaller-diameter portion of said second piston.

7. An automatic transmission according to claim 6, wherein said second inner cylinder portion has an inner surface in sliding contact with an outer surface of said smaller-diameter portion of said second piston.

8. An automatic transmission according to claim 6, further comprising a spring support fixed to said second inner cylinder portion and wherein said springs of said first spring return means are arranged in a back-to-back relationship with said springs of said second spring return means, with each of said first plurality of return springs supported by and bearing against said spring support from one direction and each of said second plurality of springs being supported by and bearing against said spring support from a second direction, the ends of said first plurality of springs opposite said spring support being connected to said first piston and the ends of said second plurality of springs opposite said spring support being connected to said second piston.

9. An automatic transmission according to claim 8 wherein said spring support is fixed to said second inner cylinder portion.

10. An automatic transmission comprising:
axially juxtaposed first and second friction engagement elements;
a first hydraulic servo unit for operating said first frictional engagement element, said first hydraulic servo unit comprising a first cylinder, a first piston, having inner and outer cylindrical surfaces and slidably supported in said first cylinder for sliding motion between a position engaging said first frictional engagement element and a disengaged position, and first spring return means for biasing said first piston toward the disengaged position, said first cylinder comprising:
a first side wall portion interposed between said first and second frictional engagement elements;
a first outer cylinder portion extending from an outer circumference of said first side wall portion toward said first frictional engagement element and slidably supporting said outer cylindrical surface of said first piston; and
a first inner cylinder portion connected to said first outer cylinder portion through said first side wall portion, extending toward said first frictional engagement element and slidably supporting said inner cylindrical surface of said first piston;
a second hydraulic servo unit for operating said second frictional engagement element, said second hydraulic servo unit comprising a second cylinder, a second piston, having larger diameter and smaller diameter cylindrical portions, slidably mounted in said second cylinder for sliding motion between a position engaging said second frictional engagement element and a disengaged position, and second spring return means for biasing said second piston toward its disengaged position, said second cylinder comprising:
a second sidewall portion interposed between said two frictional engagement elements;
a second outer cylinder portion extending from an outer circumference of said second sidewall portion toward said second frictional engagement element, said second outer cylinder portion slidably supporting the larger diameter portion of said second piston;
a second inner cylinder portion slidably supporting said smaller-diameter portion of said second piston; and
wherein a single set of springs serves as both said first spring return means and said second spring return means, each spring of said single set of springs having one end connected to said first piston and its other end connected to said second piston.

* * * * *